C. R. ARMSTRONG.
BOLT FOR LOADED GRAIN CARS.
APPLICATION FILED JULY 27, 1920.
1,391,661. Patented Sept. 27, 1921.
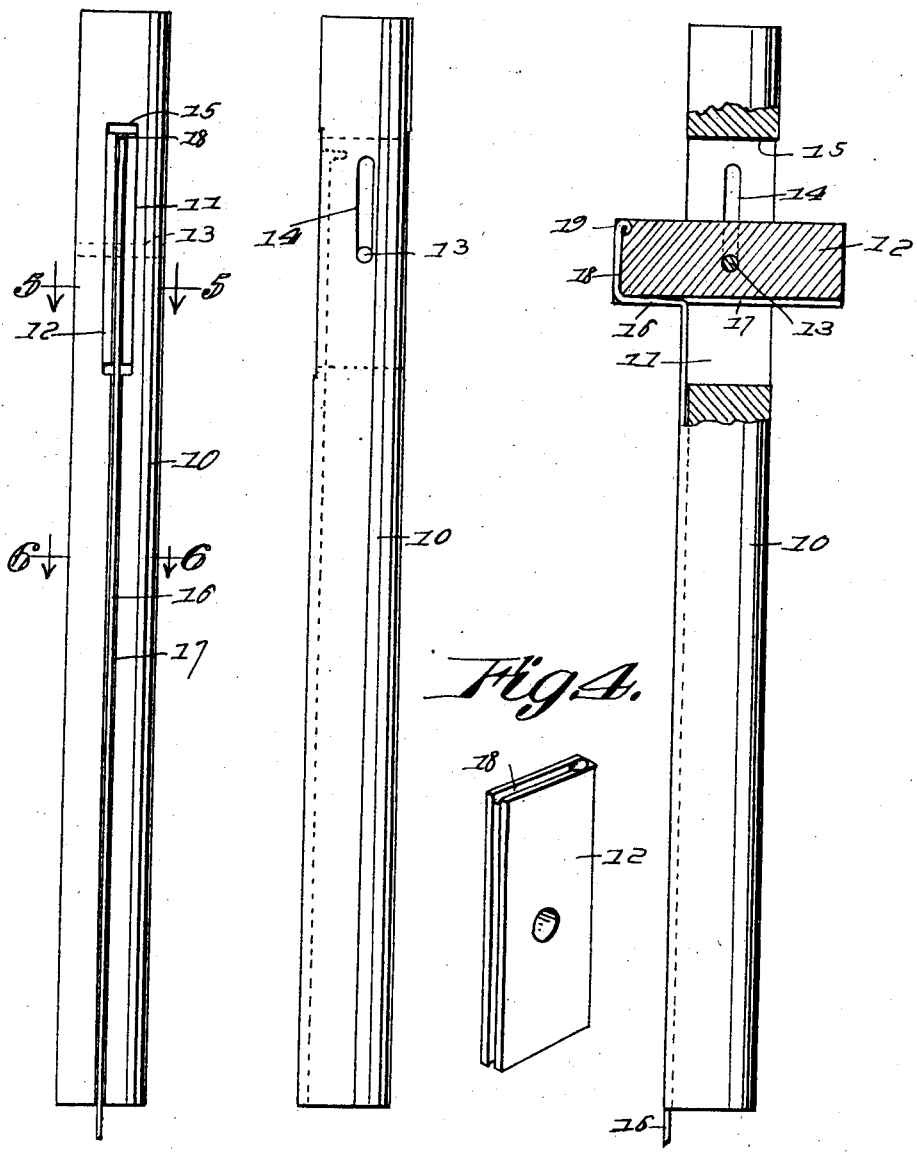

UNITED STATES PATENT OFFICE.

CHARLIE R. ARMSTRONG, OF HAWARDEN, IOWA.

BOLT FOR LOADED GRAIN-CARS.

1,391,661.

Specification of Letters Patent. Patented Sept. 27, 1921.

Application filed July 27, 1920. Serial No. 399,299.

*To all whom it may concern:*

Be it known that CHARLIE R. ARMSTRONG, a citizen of the United States of America, residing at Hawarden, in the county of Sioux and State of Iowa, have invented new and useful Improvements in Bolts for Loaded Grain-Cars, of which the following is a specification.

The object of the invention is to provide a construction of bolt which while particularly designed and adapted for loaded grain cars as a means of filling openings therein to prevent the leakage or wastage of the grain, is adapted for other uses wherein it is desirable or necessary to arrange a bolt in position by inserting the same head end foremost or in the reverse direction from that ordinarily followed in the seating or engagement of bolts and with this object in view, the invention consists of a construction and combination of parts, of which a preferred embodiment is shown in the accompanying drawings, wherein:—

Figure 1, is a side view of the bolt with the parts in the positions which they occupy when the same is about to be inserted or seated.

Fig. 2, is a similar view showing the bolt in position at right angles to that indicated in Fig. 1.

Fig. 3, is a side view partly in section showing the bolt with the cross head in its locking or holding position.

Fig. 4, is a detail view of the cross head detached.

Figs. 5 and 6 are transverse sectional views on the planes indicated by the lines 5—5 and 6—6 of Fig. 1.

The bolt consists essentially of a shank 10 provided near its head end with a longitudinal slot 11 in which is pivotally mounted the cross head 12 consisting of a block of a length nearly equal to the length of the slot and a width substantially the same as the diameter of the bolt and adapted when disposed transversely with reference thereto, to terminally project beyond the sides of the bolt for engagement with the object through which the bolt has been extended. The cross head is mounted upon the shank by means of a pivot 13 fitted in a longitudinal slot 14 whereby after the cross head has been turned to the transverse position indicated in Fig. 3, the pin will move to the upper or inner end of the head 14 to permit of the engagement of the edge of the cross head with the end wall or shoulder 15 constituting the extremity of the slot 11 so that a firm bearing of the cross head upon the member through which the bolt has been extended and which it is intended to secure, may be obtained.

Any suitable means may be employed in connection with the said end of the bolt for holding the member in place.

When providing for the operation of the cross head from the housing position indicated in Figs. 1 and 2 to the operative position indicated in Fig. 3, there is employed a leader or wire 16 extending through a shallow groove 17 arranged longitudinally of the shank and extended through a transverse seat 18 in the end of the cross head, with its terminal 19 spread or headed to produce a secure attachment sufficient to resist strain upon the latter when after the bolt has been inserted in the opening provided for its reception, tension is applied to said leader to shift the cross head from the housing position to the extended or operative position.

The invention having been described, what is claimed as new and useful is:—

A bolt having its shank provided with a longitudinal slot and a cross head pivotally mounted in said slot and having a pivot pin engaging a slot disposed in intersecting communicating relation with the first-named slot to permit longitudinal movement of the cross head when in a position transverse to the length of the shank, the shank being formed with a shallow longitudinal peripheral groove extending from the said slot to the end remote from the cross head, the latter being also formed with a similar groove extending through one end edge and one side edge, and a flexible leader disposed in said shallow groove in the shank and anchored in the cross head at one extremity of the groove formed in the end edge thereof, the said leader lying in both grooves in the cross head when the latter is in a position in alinement with the shank.

In testimony whereof he affixes his signature.

CHARLIE R. ARMSTRONG.